(12) United States Patent
Ozawa et al.

(10) Patent No.: US 6,897,270 B2
(45) Date of Patent: May 24, 2005

(54) CONTINUOUS PROCESS FOR THE PRODUCTION OF CONJUGATED DIENE POLYMERS HAVING NARROW MOLECULAR WEIGHT DISTRIBUTION AND PRODUCTS THEREFROM

(75) Inventors: Yoichi Ozawa, Kodaira (JP); David M. Roggeman, North Royalton, OH (US); H. Jerrold Miller, Savannah, GA (US); Koji Masaki, Hagashimurayama (JP); Steven Luo, Akron, OH (US); Thomas A. Antkowiak, Rittman, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/468,516
(22) PCT Filed: Feb. 28, 2002
(86) PCT No.: PCT/US02/06105
§ 371 (c)(1), (2), (4) Date: Jan. 20, 2004
(87) PCT Pub. No.: WO02/068484
PCT Pub. Date: Sep. 6, 2002

(65) Prior Publication Data
US 2004/0116638 A1 Jun. 17, 2004

Related U.S. Application Data
(60) Provisional application No. 60/272,154, filed on Feb. 28, 2001, and provisional application No. 60/290,928, filed on May 15, 2001.

(51) Int. Cl.$^7$ .................................................. C08F 2/06
(52) U.S. Cl. ..................... 526/88; 526/164; 526/335; 526/340.4
(58) Field of Search ................ 526/88, 164, 335, 526/340.4

(56) References Cited

U.S. PATENT DOCUMENTS

| 4,619,982 | A | | 10/1986 | Jenkins |
| 4,668,773 | A | | 5/1987 | Marks et al. |
| 4,689,368 | A | | 8/1987 | Jenkins |
| 4,699,960 | A | | 10/1987 | Gordini et al. ............... 526/81 |
| 4,716,257 | A | | 12/1987 | Marks et al. |
| 4,736,001 | A | | 4/1988 | Carbonaro et al. ........... 526/63 |
| 4,801,666 | A | | 1/1989 | Marks et al. |
| 5,182,244 | A | | 1/1993 | Pettijohn |
| 5,260,244 | A | | 11/1993 | Pettijohn |
| 5,567,784 | A | | 10/1996 | Wieder et al. ............... 526/164 |
| 5,686,371 | A | * | 11/1997 | Ansell et al. ............... 502/102 |
| 5,798,416 | A | | 8/1998 | Kamata et al. |
| 5,844,050 | A | | 12/1998 | Fukahori et al. |
| 6,391,990 | B1 | * | 5/2002 | Ishino et al. ................ 526/143 |
| 6,399,726 | B1 | | 6/2002 | Windisch et al. |
| 6,441,107 | B1 | * | 8/2002 | Muruganandam et al. .... 526/60 |
| 6,780,948 | B2 | | 8/2004 | Rachita et al. |
| 2001/0018394 | A1 | | 8/2001 | Brown |
| 2002/0183467 | A1 | | 12/2002 | Windisch et al. |
| 2003/0069365 | A1 | | 4/2003 | Grun et al. |
| 2003/0134999 | A1 | | 7/2003 | Windisch et al. |
| 2003/0162920 | A1 | | 8/2003 | Windisch et al. |
| 2003/0176573 | A1 | | 9/2003 | Grun et al. |
| 2004/0147694 | A1 | | 7/2004 | Sone et al. |

FOREIGN PATENT DOCUMENTS

| EP | 1 010 710 | 6/2000 |
| WO | WO 96/04323 | 2/1996 |
| WO | WO 00 69928 | 11/2000 |

OTHER PUBLICATIONS

"The Characteristics of Lanthanide Coordination Catalysts and the Cis–Polydienes Prepared Therewith" by Shen Zhiquan et al., J. of Polymer Science: Polymer Chemistry Edition, vol. 18, pp. 3345–3357 (1980).
"Polymerization of Dienes on Lanthanide Containing Catalytic Systems" by Marina et al., Polymer Science, vol. 26, No. 6, pp. 1251–1268 (1984).
"Polymerization of Butadiene and Isoprene with Lanthanide Catalysts: Characterization and Properties of Homopolymers and Copolymers" by Hsieh, Rubber Chemistry and Technology, vol. 58, pp. 117–145 (1985).
"Modification of Neodymium High Cis–1, 4–Polybutadiene with Tin Compounds" by Hattori et al., J. Elastomers and Plastics, vol. 23, pp. 135–151 (Apr. 1991).
"Chemical Modification of Neodymium High Cis–1,4–POlybutadiene with Styreneoxide," by Hattori et al., Polymers for Advanced Technology, vol. 4, pp. 450–456 (1993).

* cited by examiner

*Primary Examiner*—Fred Teskin
(74) *Attorney, Agent, or Firm*—Arthur M. Reginelli

(57) ABSTRACT

A continuous process for producing conjugated diene polymers comprising the steps of contacting, within an hydrocarbon solvent and within a continuous reactor, conjugated diene monomer and a catalyst composition prepared by combining: (a) a lanthanide compound, (b) an alkylating agent, and (c) a halogen-containing compound, and maintaining a non-ideal flow pattern within the continuous reactor so that 10% of the reagents entering the reactor at a reference time $t_0$ are still present within the continuous reactor at a time $t_0+xt_{rt}$, where $t_{rt}$ is the residence time corresponding to ideal flow within the continuous reactor and x is a numeral greater than 1.5.

14 Claims, 2 Drawing Sheets

CONTINUOUS PROCESS FOR THE PRODUCTION OF CONJUGATED DIENE POLYMERS HAVING NARROW MOLECULAR WEIGHT DISTRIBUTION AND PRODUCTS THEREFROM

This application claims benefit from International Application No. PCT/US02/06105, filed on Feb. 28, 2002, which claims benefit from U.S. Provisional Application Ser. Nos. 60/272,154, filed on Feb. 28, 2001, and 60/290,928, filed on May 15, 2001.

FIELD OF THE INVENTION

This invention relates to a continuous polymerization process for making conjugated diene polymers having high-cis content and narrow molecular weight distribution.

BACKGROUND OF THE INVENTION

Lanthanide-based catalysts are used to prepare high cis-1,4-polybutadiene. These catalyst systems are typically formed by combining a lanthanide salt, an organoaluminum compound, and a source of halogen. They typically give polymers having a cis-1,4-linkage content of greater than 93% cis microstructure.

Although these catalyst systems yield polymers having desirable high cis-1,4-microstructure, the polymers have a relatively high molecular weight distribution because the molecular weight of the polymers cannot be easily controlled. Attempts have been made to control the molecular weight of the polymers produced with these catalyst systems. For example, the aluminum to lanthanide ratio has been manipulated to affect the degree of polymerization and the polymer molecular weight. This method, however, has not proved successful because the molecular weight distribution cannot likewise be controlled.

Others have employed a silicon halide or organosilicon halide as the source of halogen, and then aged the catalyst system for at least 5 hours prior to contacting with the conjugated dienes to be polymerized. This approach, however, increases the manufacturing cost of the polymer.

There exists a need for an economical continuous polymerization process for producing conjugated diene polymers having a high cis-1,4-linkage content and narrow molecular weight distribution.

SUMMARY OF THE INVENTION

A continuous process for producing conjugated diene polymers comprising the steps of contacting, within an hydrocarbon solvent and within a continuous reactor, conjugated diene monomer and a catalyst composition prepared by combining: (a) a lanthanide compound, (b) an alkylating agent, and (c) a halogen-containing compound, and maintaining a non-ideal flow pattern within the continuous reactor so that 10% of the reagents entering the reactor at a reference time $t_0$ are still present within the continuous reactor at a time $t_0+xt_{rt}$, where $t_{rt}$ is the residence time corresponding to ideal flow within the continuous reactor and x is a numeral greater than 1.5.

Advantageously, it has been found that sufficient backmixing of polymeric intermediates within a continuous polymerization process that employs a lanthanide-based catalyst system provides conjugated diene polymers that have a surprisingly narrow molecular weight distribution. Also, the polymers made by this process can have increased reactivity toward certain functionalizing agents, which allows functionalized polymers to be produced readily with a high degree of functionality. In addition, polymers prepared by this invention give excellent viscoelastic properties such as high tensile strength, high abrasion resistance, low hysteresis, and outstanding fatigue resistance, and are therefore particularly suitable for use in various tire components such as treads and sidewalls.

DETAILED DESCRIPTION OF ILLUSTRATIVE EMBODIMENTS

Figure 1:
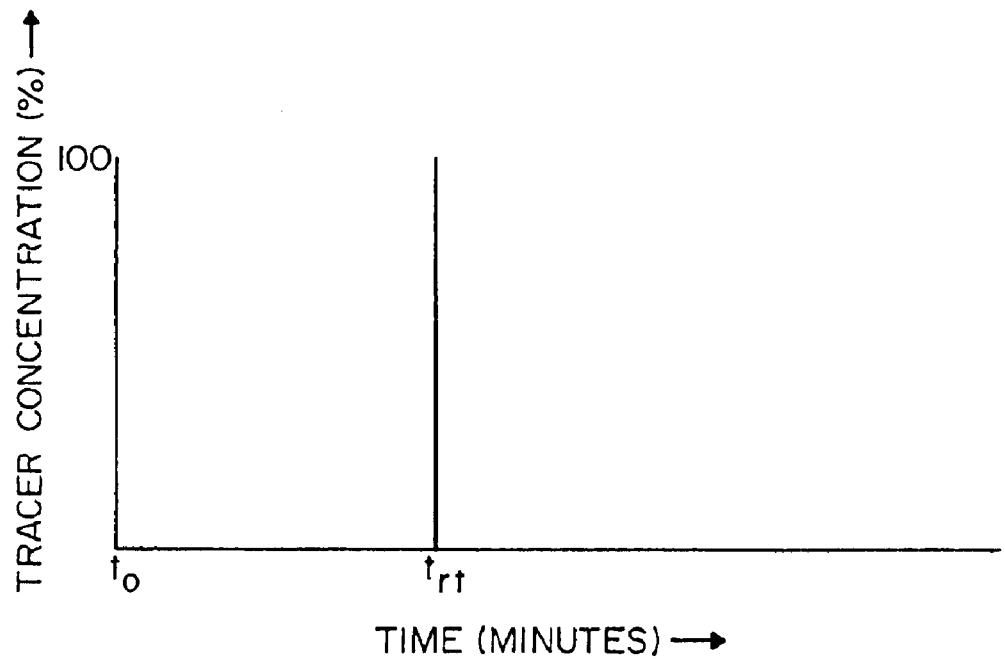
FIG. 1 is a graphical plot of an ideal residence time under plug flow conditions.

Conjugated diene monomers are continuously polymerized in hydrocarbon solvent by using a lanthanide-based catalyst composition. Generally, the catalyst composition is formed by combining (a) a lanthanide compound, (b) an alkylating agent, and (c) a halogen-containing compound. The monomer and catalyst composition or ingredients are charged to a continuous-type reactor that allows for backmixing of the polymeric intermediates, which results in the polymers having narrow, monomodal molecular weight distributions and high cis-1,4-linkage contents. This backmixing also increases the degree of living properties of the polymers, which allows them to be functionalized.

Conjugated diene monomers are generally unsaturated compounds having two or more double bonds that alternate with single bonds. Examples of conjugated diene monomers include 1,3-butadiene, isoprene, 1,3-pentadiene, 1,3-hexadiene, 2,3-dimethyl-1,3-butadiene, 2-ethyl-1,3-butadiene, 2-methyl-1,3 pentadiene, 3-methyl-1,3-pentadiene, 4-methyl-1,3-pentadiene, and 2,4-hexadiene. Mixtures of two or more conjugated dienes may also be utilized in co-polymerization. The preferred conjugated dienes are 1,3-butadiene, isoprene, 1,3-pentadiene, and 1,3-hexadiene. The most preferred monomer is 1,3-butadiene because the polymerization of this monomer according to this invention provides narrow molecular weight high cis-1,4-polybutadiene that has narrow molecular weight distribution.

Conjugated diene monomers may be used either alone or in combination. If desired, a small amount of monomer other than conjugated dienes can be used. These other monomers include, but are not limited to, vinyl aromatic compounds such as styrene. The amount of copolymerizable monomer is not limited, but is usually less than 10 percent by weight (pbw), preferably less than 6 pbw, and even more preferably less than about 3 pbw of the entire polymer.

The catalyst composition is formed by combining (a) a lanthanide compound, (b) an alkylating agent, and (c) a halogen-containing compound. Other reagents such as other organometallic compounds or Lewis bases may also optionally be included.

Various lanthanide compounds or mixtures thereof can be employed as ingredient (a) of the catalyst composition. Preferably, these compounds are soluble in hydrocarbon solvents such as aromatic hydrocarbons, aliphatic hydrocarbons, or cycloaliphatic hydrocarbons. Hydrocarbon-insoluble lanthanide compounds, however, can be suspended in the polymerization medium to form the catalytically active species and are also useful.

Lanthanide compounds include at least one atom of lanthanum, neodymium, cerium, praseodymium, promethium, samarium, europium, gadolinium, terbium, dysprosium, holmium, erbium, thulium, ytterbium, lutetium, and didymium. Preferably, these compounds include neodymium, lanthanum, samarium, or didymium. Didymium is a commercial mixture of rare-earth elements obtained from monazite sand.

The lanthanide atom in the lanthanide compounds can be in various oxidation states including but not limited to the 0, +2, +3, and +4 oxidation states. Trivalent lanthanide compounds, where the lanthanide atom is in the +3 oxidation state, are preferred. Suitable lanthanide compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds.

Because neodymium compounds are most advantageously employed, further discussion will focus on neodymium compounds, although those skilled in the art will be able to select similar compounds that are based upon other lanthanide metals.

Suitable neodymium carboxylates include neodymium formate, neodymium acetate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate, neodymium naphthenate, neodymium stearate, neodymium oleate, neodymium benzoate, and neodymium picolinate.

Suitable neodymium organophosphates include neodymium dibutyl phosphate, neodymium dipentyl phosphate, neodymium dihexyl phosphate, neodymium diheptyl phosphate, neodymium dioctyl phosphate, neodymium bis (1-methylheptyl) phosphate, neodymium bis(2-ethylhexyl) phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl) phosphate, neodymium butyl (2-ethylhexyl) phosphate, neodymium (1-methylheptyl) (2-ethylhexyl) phosphate, and neodymium (2-ethylhexyl) (p-nonylphenyl) phosphate.

Suitable neodymium organophosphonates include neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, neodymium octadecyl phosphonate, neodymium oleyl phosphonate, neodymium phenyl phosphonate, neodymium (p-nonylphenyl) phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium (1-methylheptyl) (1-methylheptyl)phosphonate, neodymium (2-ethylhexyl) (2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium (p-nonylphenyl) (p-nonylphenyl)phosphonate, neodymium butyl(2-ethylhexyl)phosphonate, neodymium (2-ethylhexyl) butylphosphonate, neodymium (1-methylheptyl) (2-ethylhexyl)phosphonate, neodymium (2-ethylhexyl) (1-methylheptyl)phosphonate, neodymium (2-ethylhexyl) (p-nonylphenyl)phosphonate, and neodymium (p-nonylphenyl) (2-ethylhexyl)phosphonate.

Suitable neodymium organophosphinates include neodymium butylphosphinate, neodymium pentylphosphinate, neodymium hexylphosphinate, neodymium heptylphosphinate, neodymium octylphosphinate, neodymium (1-methylheptyl)phosphinate, neodymium (2-ethylhexyl)phosphinate, neodymium decylphosphinate, neodymium dodecylphosphinate, neodymium octadecylphosphinate, neodymium oleylphosphinate, neodymium phenylphosphinate, neodymium (p-nonylphenyl)phosphinate, neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis(2-ethylhexyl)phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl)phosphinate, neodymium butyl(2-ethylhexyl)phosphinate, neodymium (1-methylheptyl)(2-ethylhexyl)phosphinate, and neodymium (2-ethylhexyl) (p-nonylphenyl)phosphinate.

Suitable neodymium carbamates include neodymium dimethylcarbamate, neodymium diethylcarbamate, neodymium diisopropylcarbamate, neodymium dibutylcarbamate, and neodymium dibenzylcarbamate.

Suitable neodymium dithiocarbamates include neodymium dimethyldithiocarbamate, neodymium diethyldithiocarbamate, neodymium diisopropyldithiocarbamate, neodymium dibutyldithiocarbamate, and neodymium dibenzyldithiocarbamate.

Suitable neodymium xanthates include neodymium methylxanthate, neodymium ethylxanthate, neodymium isopropylxanthate, neodymium butylxanthate, and neodymium benzylxanthate.

Suitable neodymium β-diketonates include neodymium acetylacetonate, neodymium trifluoroacetylacetonate, neodymium hexafluoroacetylacetonate, neodymium benzoylacetonate, and neodymium 2,2,6,6-tetramethyl-3,5-heptanedionate.

Suitable neodymium alkoxides or aryloxides include neodymium methoxide, neodymium ethoxide, neodymium isopropoxide, neodymium 2-ethylhexoxide, neodymium phenoxide, neodymium nonylphenoxide, and neodymium naphthoxide.

Suitable neodymium halides include neodymium fluoride, neodymium chloride, neodymium bromide, and neodymium iodide. Suitable neodymium pseudo-halides include neodymium cyanide, neodymium cyanate, neodymium thiocyanate, neodymium azide, and neodymium ferrocyanide. Suitable neodymium oxyhalides include neodymium oxyfluoride, neodymium oxychloride, and neodymium oxybromide. Where neodymium halides, neodymium oxyhalides, or other neodymium compounds containing labile halogen atoms are employed, the neodymium-containing compound can serve as both the lanthanide compound as well as the halogen-containing compound. A Lewis base such as tetrahydrofuran (THF) may be employed as an aid for solubilizing this class of neodymium compounds in inert organic solvents.

The term organolanthanide compound refers to any lanthanide compound containing at least one lanthanide-carbon bond. These compounds are predominantly, though not exclusively, those containing cyclopentadienyl (Cp), substituted cyclopentadienyl, allyl, and substituted allyl ligands. Suitable organolanthanide compounds include $Cp_3Ln$, $Cp_2LnR$, $Cp_2LnCl$, $CpLnCl_2$, $CpLn(cyclooctatetraene)$, $(C_5Me_5)_2LnR$, $LnR_3$, $Ln(allyl)_3$, and $Ln(allyl)_2Cl$, where Ln represents a lanthanide atom, and R represents a hydrocarbyl group.

Various alkylating agents, or mixtures thereof, can be used as component (b) of the catalyst composition. Alkylating agents, which may also be referred to as hydrocarbylating agents, are organometallic compounds that can transfer hydrocarbyl groups to another metal. Typically, these agents are organometallic compounds of electropositive metals such as Groups 1, 2, and 3 metals (Groups IA, IIA, and IIIA metals). Preferred alkylating agents include organoaluminum and organomagnesium compounds. Where the alkylating agent includes a labile halogen atom, the alkylating agent may also serve as the halogen-containing compound.

The term "organoaluminum compound" refers to any aluminum compound containing at least one aluminum-carbon bond. Organoaluminum compounds that are soluble in a hydrocarbon solvent are preferred. Where the alkylating agent is an organoaluminum compound that includes a labile halogen atom, the organoaluminum compound can serve as both the alkylating agent and the halogen-containing compound.

A preferred class of organoaluminum compounds that can be utilized is represented by the general formula $AlR_nX_{3-n}$, where each R, which may be the same or different, is a mono-valent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3. Preferably, each R is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, boron, silicon, sulfur, and phosphorus atoms.

Suitable organoaluminum compounds include, but are not limited to, trihydrocarbylaluminum, dihydrocarbylaluminum hydride, hydrocarbylaluminum dihydride, dihydrocarbylaluminum carboxylate, hydrocarbylaluminum bis (carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds. Trihydrocarbylaluminum, dihydrocarbylaluminum hydride, and hydrocarbylaluminum dihydride compounds are preferred.

Suitable trihydrocarbylaluminum compounds include trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Suitable dihydrocarbylaluminum hydride compounds include diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Suitable hydrocarbylaluminum dihydrides include ethylaluminum dihydride, n-propylaluminum dihydride, isopropylaluminum dihydride, n-butylaluminum dihydride, isobutylaluminum dihydride, and n-octylaluminum dihydride.

Suitable dihydrocarbylaluminum chloride compounds include diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Suitable hydrocarbylaluminum dichloride include ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds include dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, isobutylaluminum diphenoxide, and the like, and mixtures thereof.

Another class of suitable organoaluminum compounds is aluminoxanes. Aluminoxanes comprise oligomeric linear aluminoxanes that can be represented by the general formula:

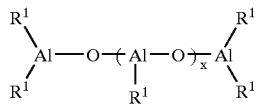

and oligomeric cyclic aluminoxanes that can be represented by the general formula:

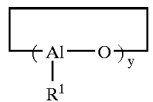

where x is an integer of 1 to about 100, preferably about 10 to about 50; y is an integer of 2 to about 100, preferably about 3 to about 20; and where each $R^1$, which may be the same or different, is a mono-valent organic group that is attached to the aluminum atom via a carbon atom. Preferably, each $R^1$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, boron, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

Aluminoxanes can be prepared by reacting trihydrocarbylaluminum compounds with water. This reaction can be performed according to known methods, such as (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, and (3) a method in which the trihydrocarbylaluminum compound is reacted with water in the presence of the monomer or monomer solution that is to be polymerized.

Suitable aluminoxane compounds include methylaluminoxane (MAO), modified methylaluminoxane (MMAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cylcohexylaluminoxane, 1-methylcyclopentylaluminoxane, phenylaluminoxane, 2,6-dimethylphenylaluminoxane, and the like, and mixtures thereof. Isobutylaluminoxane is particularly useful on the grounds of its availability and its solubility in aliphatic and cycloaliphatic hydrocarbon solvents. Modified methylaluminoxane can be formed by substituting about 20–80% of the methyl groups of methylaluminoxane with $C_2$ to $C_{12}$ hydrocarbyl groups, preferably with isobutyl groups, by using techniques known to those skilled in the art.

Aluminoxanes can be used alone or in combination with other organoaluminum compounds. In one preferred embodiment, methyl aluminoxane and diisobutyl aluminum hydride are employed in combination.

The term organomagnesium compound refers to any magnesium compound that contains at least one magnesium-carbon bond. Organomagnesium compounds that are soluble in a hydrocarbon solvent are preferred. A preferred class of organomagnesium compounds that can be utilized is represented by the general formula $MgR^2{}_2$, where each $R^2$, which may be the same or different, is a mono-valent organic group, with the proviso that the group is attached to the magnesium atom via a carbon atom. Preferably, each $R^2$ is a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atom.

Some specific examples of suitable dihydrocarbylmagnesium compounds that can be utilized include diethylmagnesium, di-n-propylmagnesium, diisopropylmagnesium, dibutylmagnesium, dihexylmagnesium, diphenylmagnesium, dibenzylmagnesium, and mixtures thereof. Dibutylmagnesium is particularly useful due to its availability and its solubility in aliphatic and cycloaliphatic hydrocarbon solvents.

Another class of organomagnesium compounds that can be utilized as ingredient (b) is represented by the general formula $R^3MgX$, where $R^3$ is a mono-valent organic group, with the proviso that the group is attached to the magnesium atom via a carbon atom, and X is a hydrogen atom, a halogen atom, a carboxylate group, an alkoxide group, or an aryloxide group. Where the alkylating agent is an organomagnesium compound that includes a labile halogen atom, the organomagnesium compound can serve as both the alkylating agent and the halogen-containing compound. Preferably, $R^3$ is a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, boron, silicon, sulfur, and phosphorus atoms. Preferably, X is a carboxylate group, an alkoxide group, or an aryloxide group, with each group preferably containing 1 to 20 carbon atoms.

Some suitable types of organomagnesium compounds that are represented by the general formula $R^3MgX$ include, but are not limited, hydrocarbylmagnesium hydride, hydrocarbylmagnesium halide, hydrocarbylmagnesium carboxylate, hydrocarbylmagnesium alkoxide, hydrocarbylmagnesium aryloxide, and mixtures thereof.

Some specific examples of suitable organomagnesium compounds that are represented by the general formula $R^3MgX$ include methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, benzylmagnesium phenoxide, and the like, and mixtures thereof.

Various compounds, or mixtures thereof, that contain one or more labile halogen atoms can be employed as ingredient (c) of the catalyst composition. These compounds may simply be referred to as halogen-containing compounds. Examples of halogen atoms include, but are not limited to, fluorine, chlorine, bromine, and iodine. A combination of two or more halogen atoms can also be utilized. Halogen-containing compounds that are soluble in a hydrocarbon solvent are preferred. Hydrocarbon-insoluble halogen-containing compounds, however, can be suspended in the oligomerization medium to form the catalytically active species, and are therefore useful.

Useful types of halogen-containing compounds include, but are not limited to, elemental halogens, mixed halogens, hydrogen halides, organic halides, inorganic halides, metallic halides, organometallic halides, and mixtures thereof.

Suitable elemental halogens include fluorine, chlorine, bromine, and iodine. Some specific examples of suitable mixed halogens include iodine monochloride, iodine monobromide, iodine trichloride, and iodine pentafluoride.

Suitable hydrogen halides include hydrogen fluoride, hydrogen chloride, hydrogen bromide, and hydrogen iodide.

Suitable organic halides include t-butyl chloride, t-butyl bromides, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, and methyl bromoformate.

Suitable inorganic halides include phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide.

Suitable metallic halides include tin tetrachloride, tin tetrabromide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

Suitable organometallic halides include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide.

The catalyst composition of this invention has very high catalytic activity for polymerizing conjugated dienes into stereoregular polydienes over a wide range of catalyst concentrations and catalyst ingredient ratios. The polymers having the most desirable properties, however, are obtained within a narrower range of catalyst concentrations and catalyst ingredient ratios. Further, it is believed that the catalyst ingredients (a), (b), and (c) may interact to form an active catalyst species. Accordingly, the optimum concentration for any one catalyst ingredient is dependent upon the concentrations of the other catalyst ingredients. The molar ratio of the alkylating agent to the lanthanide compound (alkylating agent/Ln) can be varied from about 1:1 to about 200:1, more preferably from about 2:1 to about 100:1, and even more preferably from about 5:1 to about 50:1.

The molar ratio of the halogen-containing compound to the lanthanide compound (halogen atom/Ln) can be varied from about 0.5:1 to about 20:1, more preferably from about 1:1 to about 10:1, and even more preferably from about 2:1 to about 6:1. The term molar ratio, as used herein, refers to the equivalent ratio of relevant components of the ingredients, e.g., equivalents of halogen atoms on the halogen-containing compound to lanthanide atoms on the lanthanide compound.

In another embodiment, the catalyst composition comprises (a) a lanthanide compound, and (b) an aluminoxane, with the proviso that the molar ratio of the aluminoxane to the lanthanide compound (Al/Ln) is from about 50:1 to about 50,000:1, preferably from about 75:1 to about 30,000:1, and more preferably from about 100:1 to about 1,000:1, where the molar ratio refers to equivalents of aluminum atoms on the aluminoxane to equivalents of lanthanide atoms in the lanthanide compound. Useful lanthanide compounds, and aluminoxanes, are described above.

In yet another embodiment, the catalyst composition comprises (a) a lanthanide compound, (b) an alkylating agent, and (c) a non-coordinating anion or non-coordinating anion precursor. Useful lanthanide compounds, and alkylating agents, are described above. Useful molar ratios of non-coordinating anion or non-coordinating anion precursor to lanthanide compound (An/Ln) include from about 0.5:1 to about 20:1, preferably from about 0.75:1 to about 10:1, and more preferably from about 1:1 to about 6:1.

A non-coordinating anion is a sterically bulky anion that does not form coordinate bonds with, for example, the active center of a catalyst system, due to steric hindrance. Preferred non-coordinating anions include tetraarylborate anions. More specifically, preferred non-coordinating anions include fluorinated tetraarylborate anions. Ionic compounds containing non-coordinating anions are known in the art, and also include a counter cation such as a carbonium, ammonium, or phosphonium cation. Triarylcarbonium cations are preferred. A specific example of a preferred compound containing a non-coordinating anion that may be utilized as an ingredient of the catalyst composition of this embodiment is triphenylcarbonium tetrakis (pentafluoropheynyl)borate.

A non-coordinating anion precursor may also be used. A non-coordinating anion precursor is a substance that is able to form a non-coordinating anion under reaction conditions. Useful non-coordinating anion precursors include trialkyl boron compounds, $BR_3$, where R is a strong electron-withdrawing group, such as pentafluorophenyl group.

The catalyst composition is formed by combining or mixing the catalyst ingredients (a), (b), and (c). Although an active catalyst species is believed to result from this combination, the degree of interaction or reaction between the various ingredients or components is not known with any great degree of certainty. Therefore, the term "catalyst composition" has been employed to encompass a simple mixture of the ingredients, a complex of the various ingredients that is caused by physical or chemical forces of attraction, a chemical reaction product of the ingredients, or a combination of the foregoing.

The catalyst composition of this invention can be formed by using one of the following methods, although it should be understood that the catalyst ingredients are continuously fed into the continuous reactor.

First, the catalyst composition may be formed in situ by separately adding the catalyst ingredients, which are preferably within a solvent, to the reactor. Where the ingredients contact one another, as well as the monomer, which is being separately added to the reactor, within the reactor.

Second, the catalyst composition may be formed by using two catalyst feed lines. The first line includes a combination of the alkylating agent and the lanthanide compound, together with a solvent, either in the absence or presence of conjugated diene monomer. This combination is then fed into the reactor where it is contacted with the halogen-containing compound, which is fed to the reactor by a separate line. The halogen-containing compound is preferably carried by a solvent and is delivered in the absence or presence of monomer.

Third, and most preferred, the catalyst composition may be formed by using a pre-forming process. According to this process, a small amount of monomer within solution is contacted with the alkylating agent within a feed line. This combination of monomer and alkylating agent is then contacted with the lanthanide compound, and subsequently the halogen-containing compound is introduced into the feed line. This in-line combination preferably occurs at a temperature of about −20° C. to about 80° C. Also, once the halogen-containing compound is introduced into the feed line, the preformed catalyst is preferably introduced into the continuous reactor within less than about 10 minutes. The amount of conjugated diene monomer that is used for pre-forming the catalyst can range from about 1 to about 500 moles per mole, more preferably from about 5 to about 250 moles per mole, and even more preferably from about 10 to about 100 moles per mole of the lanthanide compound. The major portion of the monomer to be polymerized is introduced into the polymerization reactor via a separate feed line. Advantageously, by pre-forming the catalyst composition in this manner, it has been found that higher polymer yield can be obtained at lower agitation speeds. While the lower agitation speeds may not ultimately impact the degree of backmixing, i.e., the non-ideal flow of the molecules within the reactor, the degree of agitation has been found to impact polymer yield where the catalyst composition is not pre-formed according to the preferred method. Accordingly, one benefit to pre-forming the catalyst in this manner is the reduced amount of energy required to agitate the polymerization mixture within the reactor.

When a solution of the catalyst composition or one or more of the catalyst ingredients is prepared outside the polymerization system as set forth in the foregoing methods, an organic solvent or carrier is preferably employed. The organic solvent may serve to dissolve the catalyst composition or ingredients, or the solvent may simply serve as a carrier in which the catalyst composition or ingredients may be suspended. The organic solvent is preferably inert to the catalyst composition. Useful solvents include hydrocarbon solvents such as aromatic hydrocarbons, aliphatic hydrocarbons, and cycloaliphatic hydrocarbons. Non-limiting examples of aromatic hydrocarbon solvents include benzene, toluene, xylenes, ethylbenzene, diethylbenzene, mesitylene, and the like. Non-limiting examples of aliphatic hydrocarbon solvents include n-pentane, n-hexane, n-heptane, n-octane, n-nonane, n-decane, isopentane, isohexanes, isopentanes, isooctanes, 2,2-dimethylbutane, petroleum ether, kerosene, petroleum spirits, and the like. And, non-limiting examples of cycloaliphatic hydrocarbon solvents include cyclopentane, cyclohexane, methylcyclopentane, methylcyclohexane, and the like. Commercial mixtures of the above hydrocarbons may also be used. For environmental reasons, aliphatic and cycloaliphatic solvents are highly preferred. The foregoing organic solvents may serve to dissolve the catalyst composition or ingredients, or the solvent may simply serve as a carrier in which the catalyst composition or ingredients may be suspended. These solvents may also be employed to carry the monomer to the reactor or to dilute the polymerization medium within the reactor.

The production of cis-1,4-polydiene is accomplished by polymerizing conjugated diene monomer in the presence of a catalytically effective amount of the foregoing catalyst composition. The total catalyst concentration to be employed in the polymerization mass depends on the interplay of various factors such as the purity of the ingredients, the polymerization temperature, the polymerization rate and conversion desired, the molecular weight desired, and many other factors. Accordingly, a specific total catalyst concentration cannot be definitively set forth except to say that catalytically effective amounts of the respective catalyst ingredients should be used. Generally, the amount of the lanthanide compound used can be varied from about 0.01 to about 2 mmol, more preferably from about 0.02 to about 1 mmol, and even more preferably from about 0.05 to about 0.5 mmol per 100 g of conjugated diene monomer.

A continuous polymerization process is a process whereby ingredients are continuously introduced into a reactor and product is continuously removed from the reactor. Generally, where a solvent is employed that dissolves or otherwise carries a catalyst composition and ingredients, the flow of the solvent and, thus, the catalyst composition and ingredients, generally approximates idealized flow through the reactor; i.e., plug flow and mixed flow. But, the continuous reactors employed in the process of the present invention are purposefully designed to deviate from this idealized flow pattern.

Generally, this non-ideal flow can be achieved either through sufficient agitation of the solvent, catalyst composition, and ingredients flowing through the reactor or by the creation of stagnant regions within the reactor through the provision of baffles and the like. Advantageously, this agitation and/or baffling mixes the ingredients, catalyst intermediates, polymer intermediates, and polymer product, so as to sufficiently contact one another as they flow through the continuous reactor. In other words, the catalyst intermediates, polymer intermediates, and polymer products are "backmixed" within the reactor so as to contact the new monomer and catalyst ingredients entering the reactor. Unexpectedly, this backmixing within the continuous reactor advantageously serves to provide products with a narrow molecular weight distribution and a high percentage of polymers with pseudo-living ends.

Any reactor that is capable of receiving a continuous flow of ingredients and delivering a continuous flow of product can be employed. These reactors may include continuous-stirred-tank reactors, and plug-flow reactors, and the like. Continuous-stirred-tank reactors are preferred.

The ingredients required to carry out the polymerization process are preferably charged to the reactor in streams; i.e. they are preferably introduced as liquids or solutions. The ingredients can be charged in separate streams or certain ingredients can be combined before charging the reactor.

In one embodiment, the monomer, lanthanide metal compound, alkylating agent, and optionally a solvent, are combined into one stream before charging to the reactor. The halogen-containing compound and additional solvent are then separately charged to the reactor. By combining the monomer, lanthanide-metal compound, and alkylating agent before contacting with the halogen-containing compound, impurities that may react with the active catalyst species within the reactor are believed to be scavenged by the organo-aluminum compound. Thus, this process is preferred, although not required.

In another embodiment, the catalyst ingredients are combined within a feed line prior to entry into the continuous reactor. This feed line may optionally include the monomer to be polymerized, although it is preferred that the feed line only include a fraction of the monomer to be polymerized. Preferably, the alkylating agent is added to the feed line first, followed by the lanthanide-metal compound, and ultimately the halogen-containing compound.

Because non-ideal flow is required to yield the advantages of this invention, these advantages are advantageously achieved once the reactor is operating at a steady state. The system is operated for a sufficient amount of time to achieve a steady state.

The catalyst intermediates, polymer intermediates, and polymer products are backmixed within the reactor so that these products and intermediates can contact the stream of reactants entering the reactor. The degree of backmixing that is necessary to achieve the benefits of this invention is discussed in terms of the amount of material introduced in the reactor and the amount of that material that remains within the reactor after a specified time. In other words, the non-ideal flow pattern, which is caused by backmixing, can be characterized by how long individual molecules remain in the reaction vessel.

In the art, flow patterns are typically analyzed by the distribution of residence times of the flowing fluid, i.e., the residence time distribution (RTD). The RTD approach to non-ideal flow is generally known and analyses for RTD are provided in Octave Levenspiel, *Chemical Reaction Engineering*, $2^{nd}$ Edition, John Wiley & Sons, Inc., New York (1972) Chap. 9, pp. 253–314, which is incorporated herein by reference.

The distribution of residence times of flowing fluid within a reaction vessel can be directly determined by the stimulus-response experiment, which is generally known. Under non-ideal flow, it is evident that elements of fluid traveling through the reactor may require different lengths of time to pass through the reaction vessel. The distribution of these times for the stream of fluid leaving the vessel is called the residence time distribution (RTD) of fluid. In the stimulus-response experiment, the stimulus is a tracer input into the fluid entering the vessel, whereas the response is a time record of the tracer leaving the vessel. Any material that can be detected and that does not disturb the flow pattern in the vessel can be used as a tracer, and any type of input signal may be used e.g., a random signal, a periodic signal, a step signal, or a pulse signal. Although each of these different input signals provide the same information, it is well known that the step signal and pulse signal are the simplest to treat. The pulse signal is considered hereinbelow.

With no tracer initially present, an idealized instantaneous pulse of tracer is imposed into the stream entering the vessel. The tracer concentration exiting the vessel is then measured and plotted as a function of time to provide the RTD of the fluid within the vessel. To illustrate this concept, reference is made to FIGS. 1 and 2.

FIG. 1 displays the residence time distribution of fluid flowing through a reactor in an idealized flow pattern such as plug flow. Plug flow is characterized by the fact that the flow of the fluid through the reactor is orderly, with no element of the fluid overtaking or mixing with any other element ahead or behind, such that the residence time in the reactor is the same for all elements of the fluid. Thus, as in FIG. 1, elements entering the reactor at a time $t_0$ will leave the reactor at a time $t_0+t_{rt}$, where $t_{rt}$ is the ideal flow residence time within the reactor at a given flow rate. Time $t_{rt}$ is generally the volume of the reactor divided by the volumetric flow rate.

Figure 2:
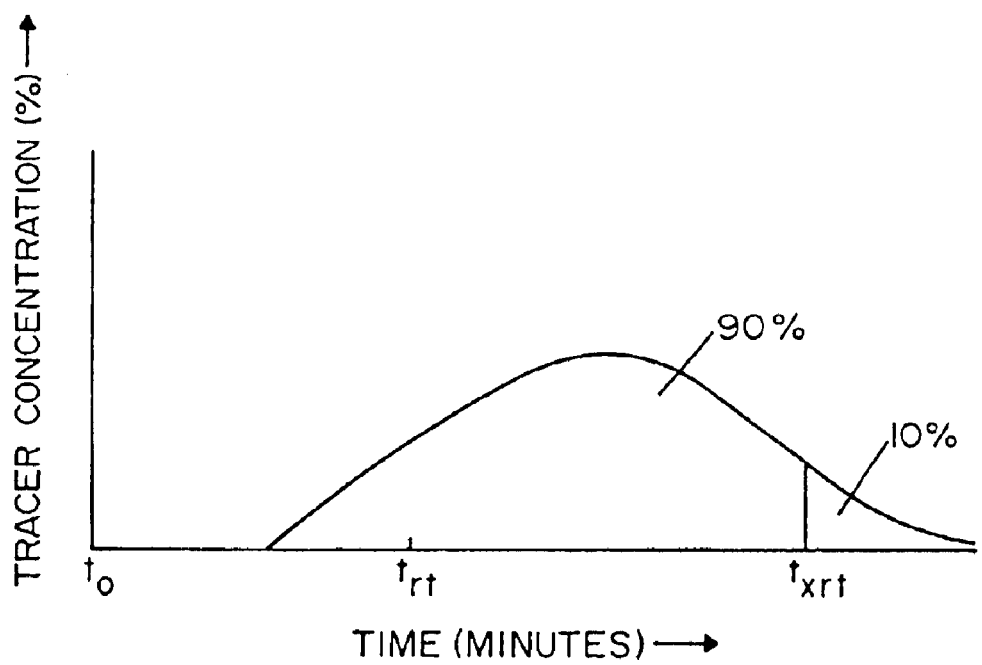
FIG. 2 is a graphical plot of a non-ideal residence time under backmixing conditions.

In contrast FIG. 2 displays a residence time distribution of fluid flowing through a reactor in a non-ideal flow pattern. As mentioned, non-ideal flow is characterized by the fact that elements within the reactor require different lengths of time to pass through the reactor. Thus, as in FIG. 2, elements entering the reactor at a time $t_0$ may exit the reactor at fractions or multiples of a time $t_0+t_{rt}$, which, again, is the ideal flow residence time within the reactor at a given flow rate. The tracer test can be used to produce these residence time distributions.

To summarize, under ideal flow patterns, a tracer input at time $t_0$ would leave the reactor at time $t_0+t_{rt}$, wherein $t_{rt}$ is the residence time corresponding to an ideal flow within the vessel. This is not the case under non-ideal flow. In other words, only a fraction of a tracer input entering the reactor at time $t_0$ will be expected to exit the vessel at time $t_0+t_{rt}$. Depending upon the degree of backmixing within the system, a fraction of the tracer input may remain in the reaction vessel for a residence time that is some multiples of the residence time expected under ideal flow, whereas a fraction of the tracer input may already exit the reactor at some fractions of the residence time expected under ideal flow.

The residence time distributions useful in producing conjugated diene polymers having low molecular weight distributions according to the present invention are described hereinbelow by defining the fraction of the ingredients that enter the continuous reactor at a reference time $t_0$ and that are still present within the reactor at a time $t_0+xt_{rt}$, wherein $t_{rt}$ is as above and x is a numeric multiplier. To achieve the benefits of this invention, the degree of backmixing within the continuous reactor must be sufficient to achieve a non-ideal flow pattern wherein 10% of the reagents entering the continuous reactor at a reference time $t_0$ are still present within the continuous reactor at time $t_0+xt_{rr}$, where x is a number greater than about 1.5, more preferably greater than about 1.7, even more preferably greater than about 1.9, still more preferably greater than about 2.0, and even yet more preferably greater than about 2.2. In the most preferred embodiments, x should be from about 1.7 to about 2.2, and most preferably about 2.0.

Several factors can affect backmixing. One factor is the length/diameter ratio (L/D ratio) of a cylindrical continuous reactor, when such a reactor is employed. Generally, as the L/D ratio decreases, the degree of backmixing resultant from a constant agitation through stirring mechanisms will tend to increase.

Another factor affecting the degree of backmixing within a given system concerns the flow rate of the fluid through the continuous reactor. As the flow rate decreases, the residence time of the fluid increases, and the degree of backmixing realized is also increased.

Yet another factor affecting the degree of backmixing within a given system is the type of mixing device or agitator that is employed. Any device employed in the art can be employed so long as they achieve the desired degree of backmixing. These devices may include helical mixers as well as the more common turbin mixers, which include those mixing devices that include a shaft with one or more turbins or mixing bars. More generally, mixing devices may be classified as either vertical flow or horizontal flow mixers. While either type of mixing device may be employed, it is generally preferable to employ a vertical flow-mixing device. This is especially true when cylindrical reactors are employed. Ideally, these vertical flow mixing devices will impact the movement of fluids and the like within the reactor in a downward manner so that reactive intermediates and products can be forced downward toward the reagents that are being introduced at or near the bottom of the reactor.

Agitation speed also affects the degree of backmixing within a system. As agitation speed increases in a stirred system, backmixing tends to increase.

The successful production of conjugated diene polymers having low molecular weight distributions according to this invention is dependant upon the implementation of sufficient backmixing within the continuous reactor employed. The degree of backmixing is likewise dependent upon physical design characteristics e.g., L/D ratio, flow rate, and agitation speed, as well as chemical interactions e.g., polymerization rate and cement viscosity, within the particular system under study. Thus, the means for providing sufficient backmixing in a given system cannot be generally explained so as to encompass either all of the various design characteristics that may be included or the chemical interactions that may be involved. Rather, the means for achieving sufficient backmixing so as to realize the desired residence time distribution within the reactor will need to be experimentally determined for the particular system under study. The tracer test may be used for this purpose.

The most effective temperature at which to carry out the polymerization may vary depending upon many conditions. Preferably, however, the polymerization vessel is maintained at a temperature from about 38° C. to about 116° C., more preferably from about 66° C. to about 110° C., and even more preferably from about 93° C. to about 104° C.

The polymer yield is also an important factor in achieving the benefits of this invention. Accordingly, the residence time and degree of backmixing should be sufficient to provide a polymer yield of at least 85%, preferably at least 90%, and more preferably at least 95%.

The polymers obtained by the process of this invention can be coupled or functionalized by further reaction with terminators or functionalizing agents. Advantageously, maintaining backmixing during the polymerization according to this invention provides polymers that not only have low molecular weight distributions, but also have increased reactivity toward functionalizing agents. Particularly, it has been determined that the polymer products of the present invention exhibit an unexpectedly increased percentage of pseudo-living ends, which are capable of further reaction with desirable coupling or functionalizing terminators as generally known in the art.

Functionalized polymers are generally prepared by contacting one or more functionalizing agents with a pseudo-living polymer prior to quenching the polymerization mixture. If a solvent is employed to bring the pseudo-living polymer and functionalizing agent into contact, it is preferable to employ a solvent either in which both the pseudo-living polymer and the functionalizing agent are soluble or in which they may both be suspended. Preferably, this contacting takes place at a temperature of less than 160° C., and more preferably at a temperature from about 0° C. to about 100° C. Further, the reaction time is preferably from about 0.1 to about 10 hours, and more preferably from about 0.2 to about 5 hours.

The amount of the functionalizing agent used can vary. Preferably, from about 0.01 to about 200 moles of the functionalizing agent per mole of the lanthanide, more preferably from about 0.1 to about 150 moles per mole of the lanthanide, and even more preferably from about 0.2 to about 10 moles of the lanthanide compound are employed.

After the reaction between the pseudo-living polymer and the functionalizing agent is completed, the polymerization mixture is quenched by using reagents such as, but not limited to, isopropyl alcohol, methanol, and water. Stabilizers, such as 2,6-di-tert-butyl-4-methylphenol (BHT), can be added during or after quenching.

Before quenching the polymerization mixture, however, certain reactive compounds may optionally be added to provide additional functionality to the polymer. These reactive compounds include those that will undergo addition reactions with metal alkoxides or metal amides. Addition of a protic quenching agent is believed to remove the metal via a substitution reaction and thereby leave a lanthanide or aluminum amino group at the polymer chain end. A reaction between the metal amide and the metal amide-reactive compound before quenching is believed to provide additional functionality.

The polymer product can be recovered by using any technique that is commonly employed in the art. For example, the polymer product can be coagulated in a hindered solvent such as isopropyl alcohol, and then dried in a hot air oven or hot mill. Alternatively, the polymer product can be recovered by steam desolventization and successive hot air drying or drying on a hot mill or the like. A processing oil can be added prior to finishing.

Exemplary coupling and functionalizing agents include, but are not limited to, metal chloride, alkoxysilanes, imine-containing compounds, esters, ester-carboxylate metal complexes, alkyl ester carboxylate metal complexes, aldehydes or ketones, amides, isocyanates, isothiocyanates, imines, and epoxides. These types of coupling and functionalizing agents are described in, inter alia, International Application Nos. PCT/US00/30743, PCT/US00/30875, and PCT/US00/30743: U.S. Pat. Nos. 4,906,706, 4,990,573, 5,064,910, 5,567,784, 4,736,001, 4,699,960, and 5,844,050; Japanese Patent Application Nos. 05-051406A, 05-059103A, 10-306113A, and 11-035633A, the teachings of which are incorporated herein by reference. Theses coupling and functionalizing agents can be reacted with the pseudo-living polymers by admixing them together within the top of the polymerization reactor, or within a subsequent reactor downstream from the main reactor, or within a polymer cement transfer line that connects the polymerization reactor and the cement blend tank.

The polymer resulting from the continuous polymerization process of this invention is uniquely characterized by the following characteristics. Specifically, polybutadiene resulting from this process will be characterized by having a cis-1,4-linkage content that is greater than 95%, advantageously greater than 97%, and even more advantageously greater than 98%. The vinyl content of this polymer will advantageously be less than 2%, more advantageously less than 1.5%, and even more advantageously less than 1%. The Mooney Viscosity (ML $_{1+4}$@100° C.) of the resulting polybutadiene will generally be from about 20 to about 100, and more advantageously from about 25 to about 35. The molecular weight distribution of this polybutadiene polymer will be less than about 3.0, advantageously less than about 2.7, more advantageously less than about 2.4, even more advantageously less than about 2.3, and still more advantageously less than about 2.2.

Advantageously, the functionalized polymers of this invention can exhibit excellent viscoelastic properties and be used in the manufacture of various tire components including, but not limited to, tire treads, side walls, subtreads, and bead fillers. They can be used as all or part of the elastomeric component of a tire stock. In one embodiment, the functionalized polymers comprise greater than about 10 percent by weight (pbw), more preferably, greater than about 20 pbw, and even more preferably greater than about 30 pbw, of the elastomeric component of the tire stock. Addition of the functionalized polymers to a tire stock does not alter the type or amount of other ingredients typically included within these vulcanizable compositions of matter. Accordingly, the practice of this invention is not limited to any particular vulcanizable composition of matter or tire compounding stock.

Typically, tire stocks include an elastomeric component that is blended with reinforcing fillers and at least one vulcanizing agent. Accelerators, oils, waxes, fatty acids and processing aids are often included. Vulcanizable compositions of matter containing synthetic rubbers typically include antidegradants, processing oils, zinc oxide, optional tackifying resins, optional reinforcing resins, optional peptizers, and optional scorch inhibiting agents.

The polymers of this invention may be used in conjunction with other rubbers to form the elastomeric component of a tire stock. These other rubbers may include natural rubber, synthetic rubber, or both. Examples of synthetic rubber include synthetic polyisoprene, poly(styrene-co-butadiene), polybutadiene, poly(styrene-co-butadiene-co-isoprene) and mixtures thereof.

Reinforcing fillers may include both organic and inorganic fillers. Organic fillers include, but are not limited to carbon black, and inorganic fillers include, but are not limited to, silica, alumina, aluminum hydroxide, and magnesium hydroxide. Reinforcing fillers are typically employed in an amount from about 1 to about 100 parts by weight per 100 parts by weight of rubber (phr), and preferably from about 20 to about 80 parts by weight phr, and more preferably from about 40 to about 80 parts by weight phr based on the total weight of all reinforcing fillers employed. Typically, when an inorganic filler is used, it is used in combination with organic fillers. In these embodiments, the total amount of reinforcing filler will include from about 30 to about 99 parts by weight of inorganic filler, and 1 to about 70 parts by weight of organic filler, based on 100 parts by weight total filler. More preferably, the total filler will include from about 50 to about 95 parts by weight of inorganic filler and from about 5 to about 50 parts by weight of organic filler based on 100 parts by weight of total filler.

Carbon blacks may include any commonly available carbon black, but those having a surface area (EMSA) of at least 20 m$^2$/g, and more preferably at least 35 m$^2$/g up to 200 m$^2$/g or higher, are preferred. Surface area values used in this application are those determined by ASTM test D-1765 by using the cetyltrimethyl ammonium bromide (CTAB) technique.

Silicas (silicon dioxide) are generally referred to as wet-process, hydrated silicas because they are produced by a chemical reaction in water, and precipitated as ultrafine, spherical particles. These particles strongly associate into aggregates that in turn combine less strongly into agglomerates. The surface area, as measured by the BET method, gives the best measure of the reinforcing character of different silicas. Useful silicas preferably have a surface area of about 32 to about 400 m$^2$/g, preferably about 100 to about 250 m$^2$/g, and more preferably about 150 to about 220 m$^2$/g. The pH of the silica filler is generally about 5.5 to about 7 and preferably about 5.5 to about 6.8. Commercially available silicas include Hi-Sil™ 215, Hi-Sil™ 233, and Hi-Sil™ 190 (PPG Industries; Pittsburgh, Pennsylvania). Useful commercial grades of different silicas are also available from other sources including Rhone Poulenc.

Typically, a coupling agent is added when silica is used. One coupling agent conventionally used is bis[3(triethoxysilyl) propyl] tetrasulfide, which is commercially available under the tradename Si69 (Degussa, Inc.; New York, N.Y.). Additional coupling agents may include bis(3-(triethoxysilyl)propyl) trisulfide, bis(3-(triethoxysilyl) propyl) disulfide, 3-mercaptopropyltriethoxysilane, bis(3-(trimethoxysilyl)propyl) tetrasulfide, bis(3-(trimethoxysilyl) propyl) trisulfide, bis(3-(trimethoxysilyl)propyl) disulfide, 3-mercaptopropyltrimethoxysilane, 3-(trimethoxysilyl) propyl)diethylthiocarbamyl tetrasulfide, and 3-(trimethoxysilyl)propyl)benzothiazyl tetrasulfide. These agents are typically employed in an amount from about 1 to about 20 phr, and more preferably from about 3 to about 15 phr. Advantageously, less coupling agent is required when the functionalized polymers of this invention, which include a silane functionality, are employed.

Reinforced rubber compounds can be cured in a conventional manner with known vulcanizing agents. For example, sulfur or peroxide-based curing systems may be employed. For a general disclosure of suitable vulcanizing agents one can refer to Kirk-Othmer, ENCYCLOPEDIA OF CHEMICAL TECHNOLOGY, 3$^{rd}$ Edition, Wiley Interscience, N.Y. 1982, Vol. 20, pp. 365–468, particularly VULCANIZATON AGENTS AND AUXILIARY MATERIALS pp. 390–402, or *Vulcanization* by A.Y. Coran, ENCYCLOPEDIA OF POLYMER SCIENCE AND ENGINEERING, 2$^{nd}$ Edition, John Wiley & Sons, Inc., 1989. Vulcanizing agents may be used alone or in combination. This invention does not appreciably affect cure times. Typically, vulcanization is effected by heating the vulcanizable composition; e.g., it is heated to about 170° C. Cured or crosslinked polymers may be referred to as vulcanizates.

Tire formulations are compounded by using mixing equipment and procedures conventionally employed in the art. Preferably, an initial masterbatch is prepared that includes the elastomer component and the reinforcing fillers, as well as other optional additives such as processing oil and antioxidants. Once this initial masterbatch is prepared, the vulcanizing agents are blended into the composition. The composition can then be processed into tire components according to ordinary tire manufacturing techniques including standard rubber curing techniques. Rubber compounding techniques and the additives employed therein are generally known as disclose in *The Compounding and Vulcanization* of Rubber, by Stevens in RUBBER TECHNOLOGY SECOND EDITION (1973 Van Nostrand Reihold Company). Pneumatic tires can be made according to U.S. Pat. Nos. 5,866,171; 5,876,527; 5,931,211; and 5,971,046, which are incorporated herein by reference.

The functionalized polymers of this invention can also be used in the manufacture of hoses, belts, shoe soles, window seals, other seals, vibration damping rubber, and other industrial products.

In order to demonstrate the practice of the present invention, the following examples have been prepared and tested. The examples should not, however, be viewed as limiting the scope of the invention. The claims will serve to define the invention.

EXAMPLES

Example 1

In accordance with the teachings of this invention, high cis-1,4-polybutadiene was prepared by employing continuous polymerization techniques and a catalyst system that was formed by combining neodymium neodecanoate, triisobutylaluminum, and ethylaluminum dichloride. Specifically, the triisobutylaluminum and neodymium neodecanoate were added to a monomer stream of 1,3-butadiene monomer (within hexanes) and subsequently added to the polymerization reactor. In a second feed line, the ethylaluminum dichloride within technical hexanes was introduced into the continuous polymerization reactor. The molar ratio of the triisobutylaluminum to the neodymium neodecanoate was about 15:1, and the molar ratio of the ethylaluminum dichloride to the neodymium neodecanoate was about 2:1. The 1,3-butadiene monomer concentration within the first feed line was about 15% by weight. The amount of neodymium neodecanoate added to the feed stream was about 0.22 mmol per 100 g of monomer. The polymerization temperature was maintained at about 93° C. and the blades within the reactor were operated at about 100 rpm. The resulting polymer yield was about 90.6%.

Figure 3:
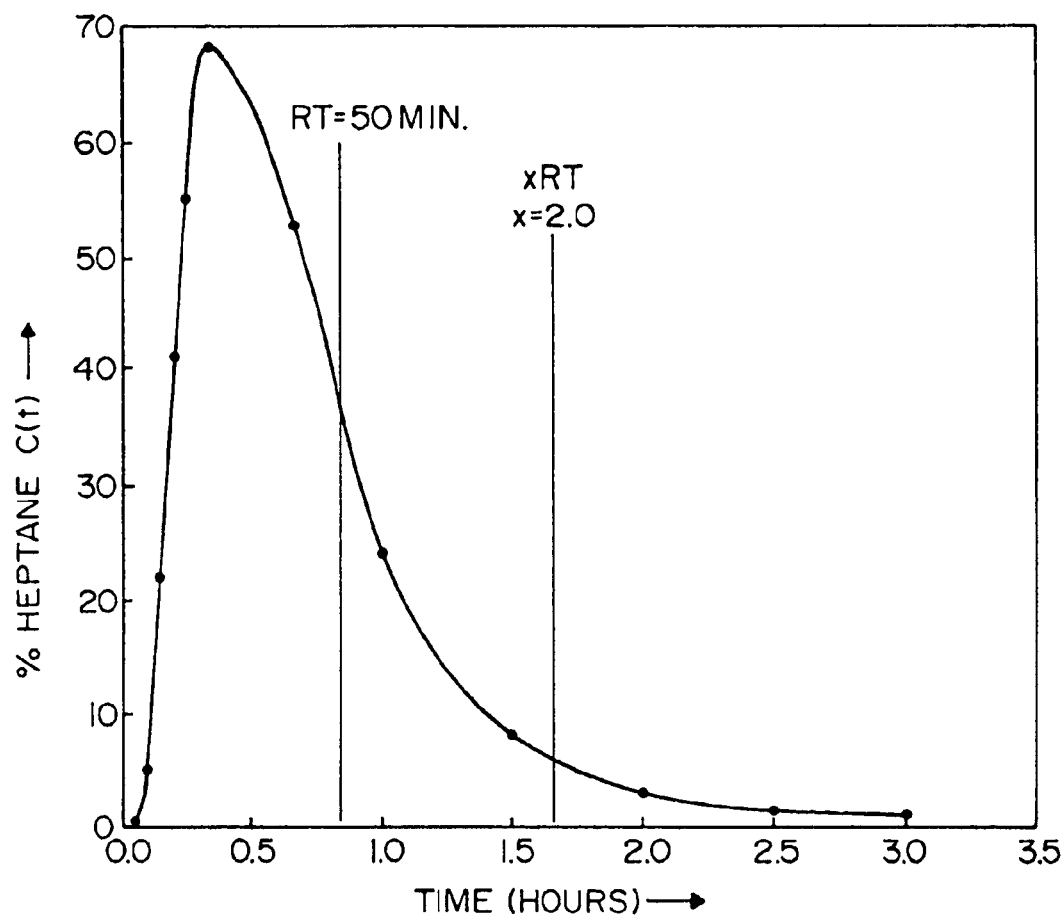
FIG. 3 is a graphical plot of the concentration of a tracer exiting a continuous polymerization process that is undergoing backmixing as a function of time.

The reactor in which the continuous polymerization took place was a cylindrical tank that, based upon its dimensions and the flow rate of the materials into the reactor, was calculated to have an ideal residence time (RT) of about 50 minutes. Once the reaction had achieved steady state, heptane was added as a tracer, and the release of heptane from the reactor was monitored and plotted. FIG. 3 provides the results of this plot. Calculations show that at time xRT where x=2.0, about 8% to about 9% of the heptane remained in the reactor due to backmixing. It is noted that a large portion of the heptane left the reactor prior to the ideal residence time (i.e., RT=50 minutes). It is believed that this tracer moved more rapidly through the reactor due to channeling, which is believed to be caused by the backmixing.

Samples of a polymer that was prepared by employing the same polymerization process set forth above were analyzed for their degree of living properties. Specifically, samples of polymer were reacted with 4,4'-bis(diethylamino) benzophenone (DEAB), which reacted with the live end of pseudo-living polymers. The functional group on the polymer chain end that results form the reaction, i.e., a tag, was detectable by UV. The analysis showed that about 20% of the polymer chains were living and therefore reacted with the DEAB. Polymer prepared with the same ingredients except within a batch polymerization were similarly analyzed and found to include only about 5% of the chains to be living.

Various modifications and alterations that do not depart from the scope and spirit of this invention will become apparent to those skilled in the art. This invention is not to be duly limited to the illustrative embodiments set forth herein.

What is claimed is:

1. A continuous process for producing conjugated diene polymers, the process comprising the steps of:

contacting, within an hydrocarbon solvent and within a continuous reactor, conjugated diene monomer and a catalyst composition prepared by combining: (a) a lanthanide compound, (b) an alkylating agent, and (c) a halogen-containing compound; and maintaining a non-ideal flow pattern within the continuous reactor so that 10% of the reagents entering the reactor at a reference time $t_0$ are still present within the continuous reactor at a time $t_0+xt_{rt}$, where $t_{rt}$ is the residence time corresponding to ideal flow within the continuous reactor and x is a numeral greater than 1.5.

2. The process of claim 1, where x is a numeral greater than 1.7.

3. The process of claim 1, where x is a numeral from about 1.7 to about 2.2.

4. The process of claim 3, where the polymer yield of the continuous process is at least 85%.

5. The process of claim 1, where said step of contacting includes charging the conjugated diene monomer and hydrocarbon solvent to the continuos reactor and separately charging the catalyst composition to the continuous reactor.

6. The process of claim 2, where the catalyst composition is charged to the continuous reactor by charging a mixture of the lanthanide compound and the alkylating agent to the continuous reactor as one stream, and charging the halogen-containing compound to the continuous reactor as a second stream.

7. The process of claim 1, wherein the conjugated diene polymer has a molecular weight distribution of less than 2.5.

8. The process of claim 1, where the alkylating agent is a dialkylaluminum compound, a trialkylaluminum compound, or a mixture thereof.

9. The process of claim 1, where the conjugated diene monomer is 1,3-butadiene.

10. The process of claim 1, where the catalyst composition is charged to the continuous reactor as a pre-formed catalyst composition that is formed by combining the lanthanide compound, the alkylating agent, and the halogen-containing compound, and optionally a conjugated diene monomer prior to introducing the catalyst ingredients into the continuous reactor.

11. The process of claim 1, where said step of contacting forms polymer intermediates.

12. The process of claim 11, where said step of maintaining a non-ideal flow pattern is achieved by backmixing the conjugated diene monomer, polymer intermediates, and conjugated diene polymers.

13. The process of claim 12, where the catalyst composition, polymer intermediates, and conjugated diene monomers are caused to contact additional conjugated diene monomer and catalyst composition entering the continuous reactor.

14. The process of claim 13, where the backmixing is achieved by baffles positioned within the continuous reactor.

* * * * *